United States Patent [19]
Yamamoto et al.

[11] Patent Number: 5,136,222
[45] Date of Patent: Aug. 4, 1992

[54] CONTROLLER FOR AUTOMATED APPARATUS, AND METHOD OF CONTROLLING SAID APPARATUS

[75] Inventors: Toshihiro Yamamoto, Yokohama; Masateru Yasuhara, Kawasaki, both of Japan

[73] Assignee: Canon Kabushiki Kaisha, Tokyo, Japan

[21] Appl. No.: 594,698

[22] Filed: Oct. 9, 1990

[30] Foreign Application Priority Data

Oct. 9, 1989 [JP] Japan .................................. 1-262183

[51] Int. Cl.⁵ ............................................ G05B 19/10
[52] U.S. Cl. .................................. 318/568.2; 318/51; 318/111; 364/474.11; 395/1
[58] Field of Search .......................... 364/513, 474.11; 318/568.1, 568.11, 568.12, 568.2, 569, 111–113, 51, 53, 560–562, 567, 600, 625

[56] References Cited

U.S. PATENT DOCUMENTS

| | | | |
|---|---|---|---|
| 4,289,997 | 9/1981 | Jung et al. .......................... | 318/113 |
| 4,338,672 | 7/1982 | Perzley et al. ................ | 318/568.2 X |
| 4,388,623 | 9/1982 | Kobayashi et al. ........... | 318/568.2 X |
| 4,410,944 | 10/1983 | Kronier ........................... | 364/134 X |
| 4,442,387 | 5/1984 | Lindbom ....................... | 318/568.2 X |
| 4,503,507 | 3/1985 | Takeda et al. ................ | 318/568.2 X |
| 4,882,670 | 11/1989 | Isobe et al. ..................... | 364/134 |
| 4,887,014 | 12/1989 | Kato ................................ | 318/568.11 |

*Primary Examiner*—William M. Shoop, Jr.
*Assistant Examiner*—David Martin
*Attorney, Agent, or Firm*—Fitzpatrick, Cella, Harper & Scinto

[57] ABSTRACT

A controller for an automated apparatus includes a plurality of operating units which operate independently while cooperating with one another, each operating unit driving a plurality of input/output elements. The controller includes a program control device for programmatically controlling the plurality of operating units, a direct designating device which, when the program control device controls the plurality of operating units independent from an external unit, is for directly designating individual input/output elements by an exclusive first set of numbers within the automated apparatus, an external interface device for interfacing an external unit, and an indirect designating device which, when the program control device communicates with the external unit via the interface device, is for indirectly designating individual input/output elements by a mutually exclusive second set of numbers within each of the operating units. The indirect designating device has a converting device for converting the second set of numbers into the first set of numbers.

7 Claims, 10 Drawing Sheets

| | OUTPUT-NUMBER CONVERSION TABLE | | INPUT-NUMBER CONVERSION TABLE | |
|---|---|---|---|---|
| | LOGICAL NUMBER | PHYSICAL NUMBER | LOGICAL NUMBER | PHYSICAL NUMBER |
| ASSEMBLING DEVICE | 1<br>2<br>3<br>4<br>. . | 1<br>2<br>6<br>7<br>. . | 1<br>2<br>3<br>4<br>. . | 1<br>4<br>5<br>6<br>. . |
| ARTICLE FEEDING DEVICE | 1<br>2<br>3<br>4<br>. . | 3<br>5<br>8<br>9<br>. . | 1<br>2<br>3<br>4<br>. . | 3<br>7<br>8<br>9<br>. . |
| MAGAZINE FEEDING DEVICE | 1<br>2<br>3<br>4<br>. . | 4<br>10<br>11<br>12<br>. . | 1<br>2<br>3<br>4<br>. . | 2<br>10<br>11<br>12<br>. . |

FIG. 4

| | | INPUT CUE | | | | | | |
|---|---|---|---|---|---|---|---|---|
| OUTPUT CUE | | | LOGICAL NUMBER | CUE BIT | INPUT END | DATA | | |
| LOGICAL NUMBER | ON/OFF | CUE BIT | | | | | | |
| | | | | | | | ASSEMBLING DEVICE | |
| 1 2 ..... | | | | | | | | |
| | | | | | | | ARTICLE FEEDING DEVICE | |
| 1 2 ..... | | | | | | | | |
| | | | | | | | MAGAZINE FEEDING DEVICE | |
| 1 2 ..... | | | | | | | | |

| OUT | ROBOT |
|---|---|
| 1 ON | OFF |
| 2 ON | OFF |
| 3 ON | OFF |
| 4 ON | OFF |
| 5 ON | OFF |
| ON | OFF |

FIG. 9

| COMMAND TYPE | UNIT ID | NUMBER OF TRANS-MISSION BYTES | STARTING NUMBER | END NUMBER | STARTING NUMBER | END NUMBER | STARTING NUMBER | END NUMBER |
|---|---|---|---|---|---|---|---|---|
| | | | 1ST BLOCK | | 2ND BLOCK | | 3RD BLOCK | |

```
01 | 02 | 06 | 07      ---- ROBOT
03 | 03 | 05 | 05 | 08 | 09   ---- STOCKER
04 | 04 | 10 | 12      ---- BUFFER
```

| UNIT | PHYSICAL NUMBER | MONITORING | RESULTS |
|---|---|---|---|
| ROBOT |  |  |  |
| STOCKER |  |  |  |

FIG. 12

CONTROLLER FOR AUTOMATED APPARATUS, AND METHOD OF CONTROLLING SAID APPARATUS

BACKGROUND OF THE INVENTION

This invention relates to a controller for an automated apparatus, such as an industrial robot, comprising a plurality of operating units which operate independently while cooperating with one another. More particularly, the invention relates to improvements in a man-machine interface during, for example, the development process of such a controller.

The inventors of this application have previously proposed a control unit for such an automated apparatus (namely an automatic assembly apparatus) in the specifications of U.S. Ser. No. 227,551 (filed Aug. 3, 1988) entitled "Controller for Automatic Assembling Apparatus" and U.S. Ser. No. 227,307 (filed Aug. 2, 1988) entitled "Automatic Article Feeding System".

Figure 2:
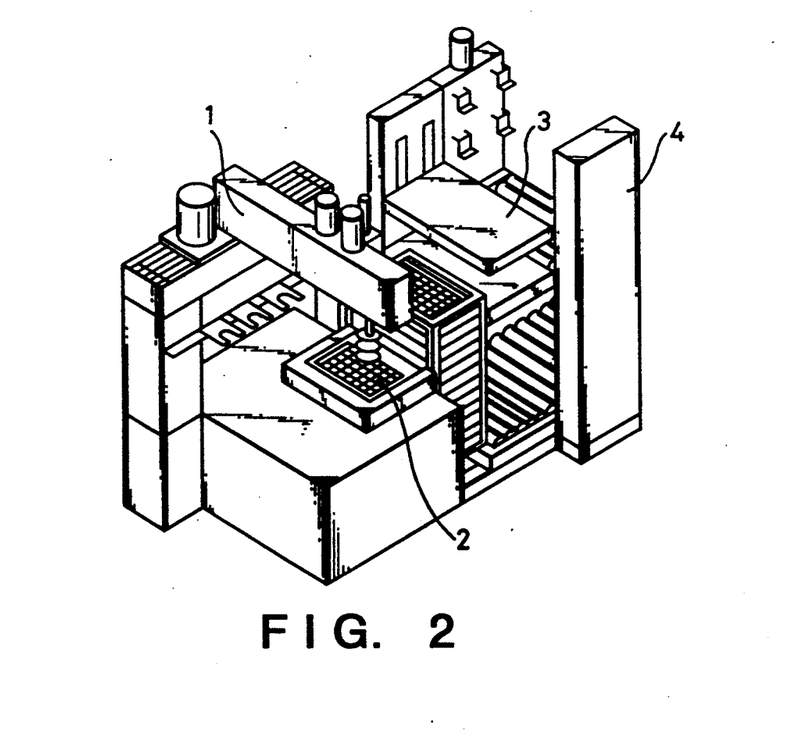
FIG. 2 is an external perspective view showing an automatic assembling apparatus of the embodiment.

In these earlier applications, an automatic article feeding system is disclosed and, as shown in FIG. 2, comprises an assembling robot 1 for grasping and assembling parts, a stocker 2 which houses, in multiple tiers, pallets accommodating a plurality of parts and from which the pallets can be extracted one at a time and supplied to the robot side, an elevator 3 for replacing empty pallets with new pallets, and a buffer 4 in which a plurality of new pallets are stored in advance so that these new pallets can be used to replenish the empty pallets replaced via the elevator 3. These earlier applications disclose also a controller for parallel control of the robot 1, stocker 2, elevator 3 and buffer 4 by means of a multibus/multitask control program method.

Figure 3:
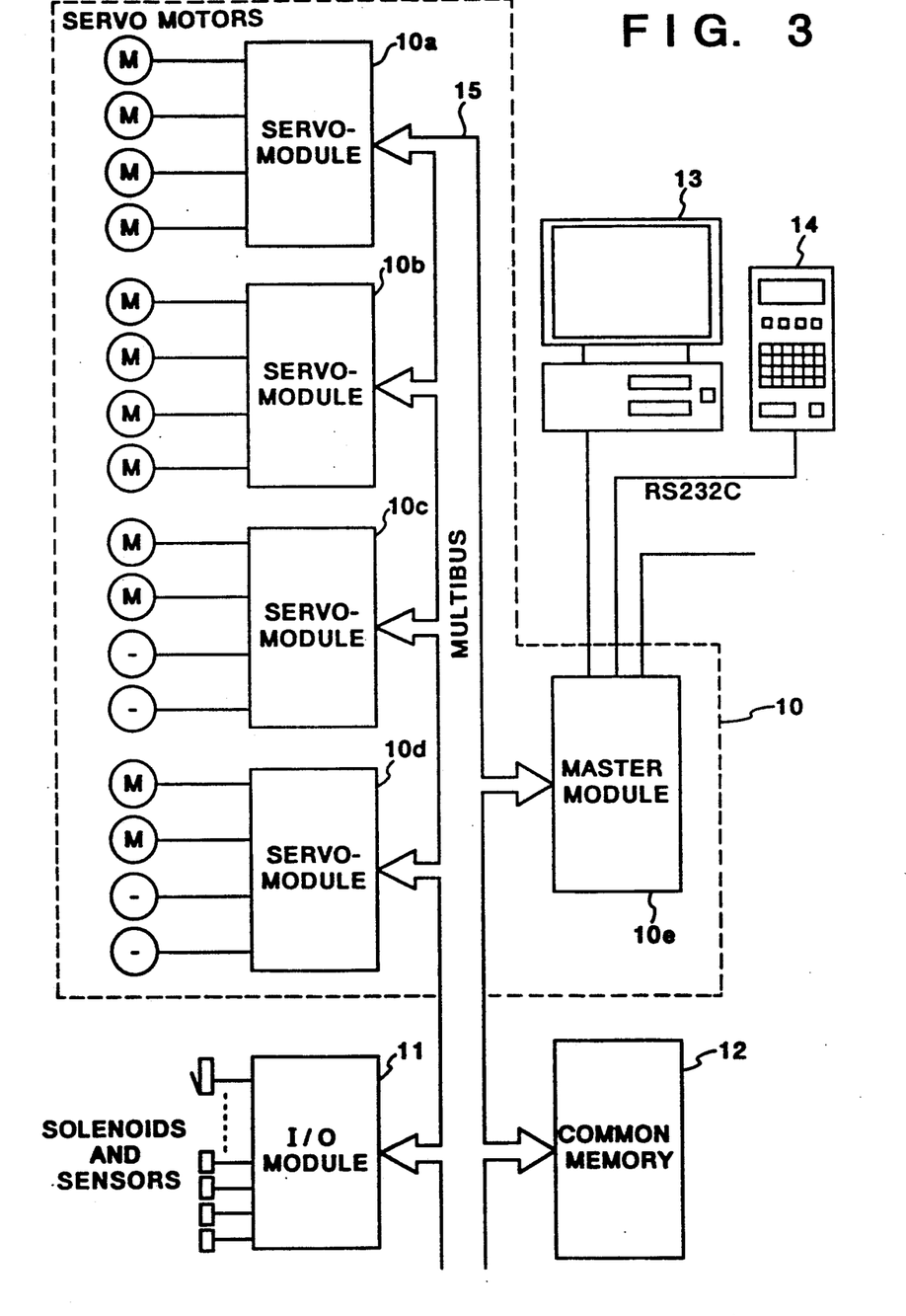
FIG. 3 is a circuit block diagram of an automatic assembling apparatus of the embodiment.

The construction of a control system using this multibus/multitask control program method disclosed in these earlier applications is shown in FIG. 3. This control system includes a main controller 10 composed of four servo-modules 10a through 10d each of which controls servo-motors M, and a master module 10e for managing and commanding these servo-modules by multitask processing. The four servo-modules 10a through 10d each execute control of the servomotors M used by respective ones of the robot 1, stocker 2, elevator 3 and buffer 4, and each servo-module contains an internal microprocessor or the like for performing such control. In other words, the robot 1, stocker 2, elevator 3 and buffer 4 constitute "operating units" in such a manner that the robot 1, stocker 2, elevator 3 and buffer 4 controlled by the corresponding servo-modules operate independently while overall cooperation among the modules is supervised by the master module 10e.

The operation of each operating unit and an indication of the status thereof are performed by a control-panel terminal 13 or teaching pendant 14 connected to the main controller 10 by an RS232C interface. The control-panel terminal 13 is referred to as an input/output device in the earlier applications.

It is possible for the control-panel terminal 13 or teaching pendant 14 to have its connection changed over with regard to any of the operating units.

An I/O module 11 is connected to a multibus 15 of the main controller 10 and performs an exchange of information via the master module 10e within the main controller 10 and a common memory 12. The devices controlled by the I/O unit 11 are all of the sensors and solenoids used by each operating unit. Since these sensors and solenoids perform simple input/output operations, they can be referred to as "input/output elements" in the narrow sense of the term.

The reason for thus constructing the control system in module form is to facilitate design of the control algorithms.

While a servo-module is provided for every operating unit, a single I/O module is shared by the operating units. More specifically, the sensors and solenoids of all operating units are supervised, under the master module 10e, by the single I/O module (i.e., the microprocessor within the module). According to the inventors, there are two reasons for the foregoing, as follows:

First, since servo-control by a servo-module entails comparatively sophisticated control, the construction of the module also is comparatively large in scale. Consequently, through a servo-module is required to correspond to each operating unit, control of sensors, solenoids and the like is a simple sequence operation, and therefore one microprocessor (i.e., one I/O module) is capable of controlling a large number of elements. Second, whereas servo-control requires a comparatively long period of time for one series of operations to end, a short period of time suffices for control of the sensors, solenoids and the like. For example, in order to turn a solenoid on, all that need be done is to deliver an ON signal to the particular solenoid. The reasons for the short time required for this control are that it is better to effect a division into servo-control and simple I/O control in order to enhance the efficiency and simplicity of the algorithms for the overall cooperative operation performed by the master module, and that servo-control is more efficient when left to servo-modules, since the master controller 10e is freed from monitoring the termination of servo-operation.

In the control system configuration of these earlier applications, sensor signal input and simple input/output operations such as solenoid drive are controlled by the single I/O module 11 for all operating units. Therefore, when the master module 10e controls these sensors and solenoids, the inputs and outputs of the input/output elements are managed using physical numbers (addresses).

In one bus system, the physical numbers (addresses) applied to the controlled devices such as the input/output elements must be mutually exclusive. This requirement is unconditional. Accordingly, when an assembly application program for performing automatic assembly by the above-described article feeding system is created, exclusive physical numbers are assigned at the time of program creation. For example, if each operating unit in the system of FIG. 2 has ten solenoids, generally the physical numbers "0"–"9" are assigned to the solenoids of the robot 1, the physical numbers "10"–"19" to the solenoids of the stocker 2, the physical numbers "20"–"29" to the solenoids of the elevator 3, and the physical numbers "30"–"39" to the solenoids of the buffer 4.

From the viewpoint of ease of management in the program development process, all of the "input/output elements" associated with the same operating unit should be apportioned consistent numbers. If consistent numbers are assigned with regard to all input/output elements of a certain operating unit, the person developing the program will be capable of recognizing the correspondence between the input/output elements and the operating unit intuitively based on these numbers.

In the process of developing such a large-scale automatic assembling apparatus, situations arise in which input/output elements such as solenoids and sensors must be added anew to the already existing input/output elements.

Assume that a new solenoid, for example, has been added to the robot 1 in FIG. 2. Since the numbers from "0" to "39" have already been assigned in the foregoing example, "40" would have to be assigned as the physical number of the added solenoid.

In the development process of an actual robot program, the aforementioned addition of new elements can take place irregularly or when not expected. Consequently, at the end of the program development process, it is possible that the numbers that have been apportioned to the input/output elements of each operating unit will exhibit no consistency. If such a situation arises, management of the input/output elements by the programmer can become very inefficient and many errors may occur.

In particular, since programming is accomplished using the single terminal 13 or the single teaching pendant 14, the inefficiency and likelihood of errors mentioned above is a major problem.

Other difficulties are also encountered. Specifically, assigning consistent numbers to all of the input/output elements of one operating unit is of course possible by providing a physical-number setting device for each and every operating unit. However, this would require a number of control-panel terminals each having a display function necessary for the setting operation. Conversely, if a control-panel terminal dedicated solely to the I/O module 11 is provided, a display assigned to each of the operating units cannot be presented. Consequently, inconvenience is encountered in terms of operation and operating errors are likely to occur.

These difficulties arise not only in the program development process but also when, say, the system shuts down during actual operation at an assembly plant and the terminal 13 indicates to the supervisor which portion of which unit is the cause of the shut-down.

This problem is not limited to the narrowly defined "input/output elements" such as the sensors and solenoids of the I/O module but applies also to broadly defined "input/output elements" such as servomotors. The reason is that a plurality of servomotors are sometimes installed within the same operating unit and servo-control of these motors is sometimes performed by a common servo-module. Whether or not it is possible for such control to be carried out by a common servo-module is only a matter of the degree of circuit integration.

SUMMARY OF THE INVENTION

The inventors have taken note of the fact that the problem of physical numbers for input/output mentioned above basically arises when there is need of an interface between man and machine.

An object of the present invention is to provide a controller for an automated apparatus which solves the aforementioned problems encountered in the prior art.

According to the present invention, the foregoing object is attained by providing a controller for an automated apparatus comprising a plurality of operating units which operate independently while cooperating with one another, each operating unit driving a plurality of input/output elements, the controller comprising program control means for programmatically controlling the plurality of operating units, direct designating means which, when the program control means controls the plurality of operating units independently from an external unit, is for programmatically and directly designating individual ones of the input/output elements by an exclusive first set of numbers within the automated apparatus, external interface means for interfacing the external unit, and indirectly and programmatically designating means which, when the program control means communicates with the external unit via the interface means, is for indirectly designating individual ones of the input/output elements by a mutually exclusive second set of numbers within each of the operating units, wherein the indirect designating means has converting means for converting the second set of numbers into the first set of numbers.

In accordance with the controller of the invention, the first set of numbers proposed by a human being becomes the "logical numbers" of every operating unit. As a result, the numbers are capable of being intuitively grasped, operation is simplified and erroneous operation is prevented.

In a preferred embodiment of the present invention, the input/output elements are narrowly defined input/output elements, namely sensor elements or solenoid elements, or broadly defined input/output elements, namely servo-elements such as servomotors.

In a preferred embodiment of the present invention, the controller has an externally provided terminal, which comprises a display device and a keyboard, capable of being switchingly connected to each of the operating units via the interface means, the controller executes a program which has an operation execution mode, a programming mode, an output setting mode and an input monitoring mode, the terminal has a program for placing the controller in any of these four modes, and the terminal is made capable of serving as a man-machine interface, with respect to any input/output element, in each of the modes by one input/output number of the second set corresponding to this input/output element. As a result, a reliable man-machine interface for each and every operating unit is made possible by a "logical number" via the terminal comprising the display device and keyboard.

In a preferred embodiment of the present invention, the "logical number" of an input element to be monitored is sent to the controller as a monitoring request at a predetermined time interval in the input monitoring mode. This facilitates the communication protocol between the terminal and the controller.

In a preferred embodiment of the present invention, the controller includes at least a master module for communicating with the terminal and controlling the overall controller, one or a plurality of slave modules for controlling the input/output elements, and a memory coupled to the master module and slave modules by a bus and shared by these modules, wherein a cueing table for cueing commands, which are for controlling the input/output elements and are managed by the "logical numbers" of these input/output elements, is provided in the memory, and the slave module has an internal conversion table for converting the "logical number" of a cued command into a number of the second set, namely a "physical number". Accordingly, the cues of every operating unit are stored in the memory in partitioned form. As a result, it is possible for the terminal to be switchingly connected to every operating unit.

In a preferred embodiment of the present invention, the slave module comprises a plurality of servo-modules for controlling respective ones of the servomotors of each operating unit, and one I/O module for controlling all sensors and solenoids in all of the operating units, wherein the conversion table is provided within the I/O module. Accordingly, all sensors and solenoids of the plurality of operating units are capable of being controlled reliably by one terminal.

Further, the present invention provides a method of designating input/output elements of an automated apparatus comprising a plurality of operating units which operate independently while cooperating with one another, each operating unit driving a plurality of input/output elements, the designating method comprising the steps of identifying whether input/output elements are designated externally or internally, directly designating individual ones of the input/output elements by an exclusive first set of numbers within the automated apparatus in a case where the input/output elements are designated internally when a program controlling the input/output elements controls the plurality of operating units independently from an external unit, indirectly designating individual ones of the input/output elements by a mutually exclusive second set of numbers within each of the operating units when the program communicates with an external unit, and converting the second set of numbers into the first set of numbers.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 14 is a diagram of the modification of the conversion table used for a case where different operating units use the same element.

DESCRIPTION OF THE PREFERRED EMBODIMENT

Reference will be made to the drawings to describe an embodiment in which the present invention is applied to the controller for an automatic assembling apparatus disclosed in the earlier applications mentioned above. Accordingly, a hardware configuration the same as that shown in FIG. 3 is used as the hardware configuration of this embodiment. The portions that differ are the constitution of the data contained in the common memory, part of the program of the master module 10e, and part of the program of the terminal 13. In this embodiment, the input/output elements are sensors and solenoids. It goes without saying that the input/output elements can be servomotors or the like.

Physical Numbers and Logical Numbers

The present embodiment is characterized in that when one I/O module is used, one group of numbers obtained by dividing mutually exclusive "physical numbers" continuously or intermittently is assigned in advance to each of the input/output elements of a plurality of mutually independent operating units, while exclusive "logical numbers", which are separate from the physical numbers, are set only within each operating unit. The "physical numbers" can be thought of as being dealt with by the system, and the "logical numbers" can be thought of as being dealt with by the programmer.

The main controller for controlling the plurality of operating units has one terminal comprising one display device and one keyboard and capable of being freely switched over to each operating unit. In addition, the main controller can be set to an operation execution mode, a programming mode, an output setting mode and an input monitoring mode.

In this embodiment, a command designating which operating unit is to be assigned to terminal 13 is sent from the terminal 13. After the operating unit has been assigned to the terminal 13, the operator designates, via the terminal 13, the input/output element of the operating unit that is to be controlled. When this designation is made the "logical number" of the input/output element of this operating unit is designated. The "logical number" is converted into a "physical number" within the main controller 10.

Figure 1:
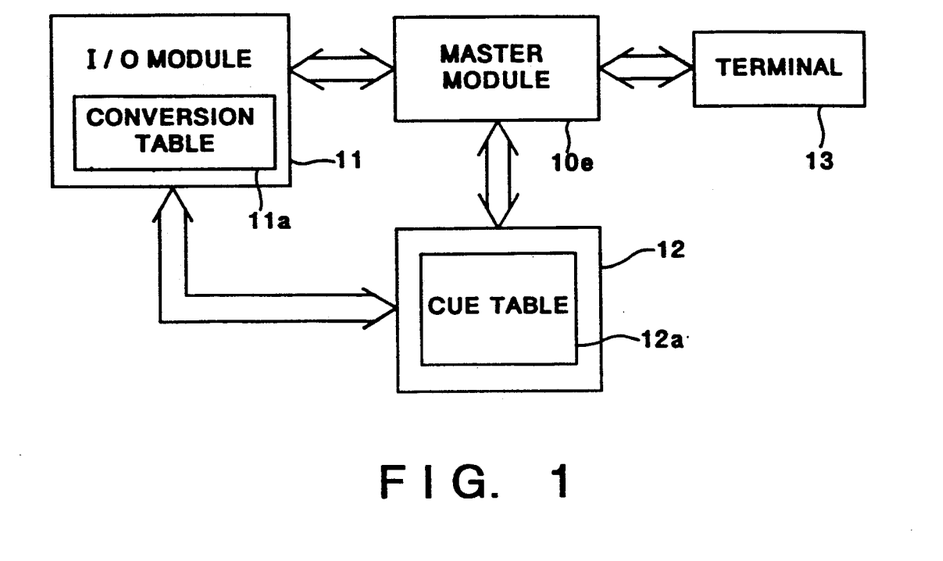
FIG. 1 is a block diagram illustrating the fundamental construction of an apparatus embodying the present invention.

FIG. 1 is a diagram showing the manner in which the conversion of the logical number to the physical number is performed in this embodiment.

In FIG. 1, a conversion table 11a (see FIG. 4) for making the conversion between the logical number and physical number of an input/output element is created in advance and preserved in the I/O module 11. As described above, control of the sensors, solenoids, etc., of the operating units such as the robot and stocker is carried out by the I/O module 11. A cue table 12a (see FIG. 5) of input/output operations is created for every operating unit and preserved in the common memory 12. The input/output operation referred to here means an input operation or output operation with regard to an input/output element such as a sensor or solenoid.

The conversion table 11a and cue table 12a are created when the system is started up. More specifically, the conversion table 11a is created by the I/O module 11 upon receiving information from the master module 10e, and the cue table 12a is created by the master module 10e. The creation of the conversion table will now be described in relation to FIG. 11.

A PCB (printed circuit board) of the I/O module or the like is attached to a connector on a mother board along which the multibus is provided. Wiring from the PCB of this I/O module 11 to each of the input/output elements is accomplished via front plane connectors (not shown) of the PCB. The physical numbers can be thought of as being the terminal numbers of these front plane connectors. Since the terminals are independent with regard to the input elements and output elements, the same physical numbers are allowed for the solenoids and sensors in, say, the same robot.

Conversion Table

Figure 4:
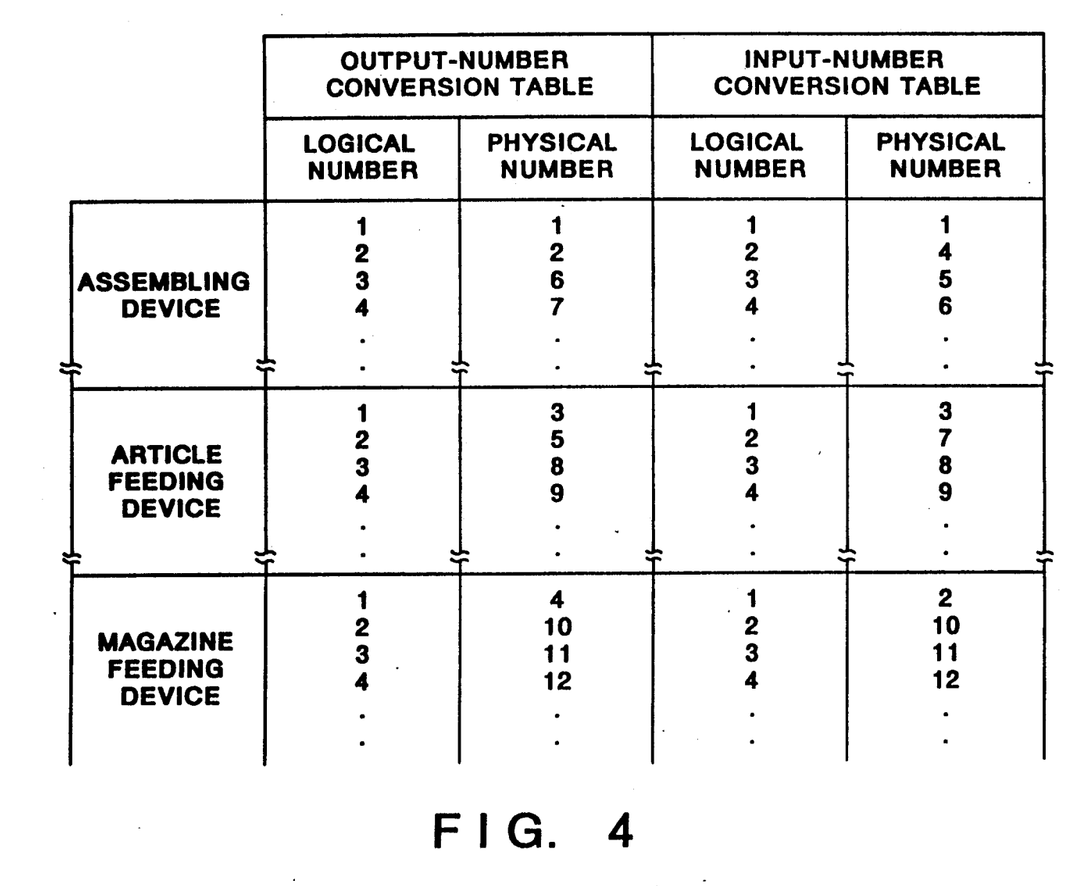
FIG. 4 is a diagram showing the constitution of a conversion table used in a system of the embodiment.

The constitution of the conversion table 11a will be described with reference to FIG. 4. In general, if the number of operating units is N, the table will have N×2×2 dimensions. In the example of FIG. 4, three operating units, namely an assembling device (robot 1), an article feeding device (stocker 2) and a pallet feeding device (buffer 4) are illustrated for the sake of convenience. The conversion table 11a has an output-number conversion table for output elements such as solenoids, and an input number conversion table for input elements such as sensors. With regard to the assembling device, a logical number "1" is given to a solenoid of physical number "1", and a logical number "2" is given to a sensor of physical number "4". Accordingly, the operator places the element of logical number "1" in the output mode in order to drive the solenoid "1" and places the element of logical number "2" in the input mode in order to input a signal from the sensor "4".

In the example shown in FIG. 4, the constitution of the table is such that a certain input element or output element is used by only one operating unit and not by other operating units. For example, the output element of assembling device 1 of physical number "1" is not used in the other operating units. However, there are cases where a sequence operation, for example, is performed with, say, the same sensor with physical number "1" being shared by the assembling device 1 and article feeding device 2. For the cases, a logical number "5" will be assigned to the sensor of the assembling device 1 of physical number "1" for article feeding device 2 in the conversion table of FIG. 4. Thus, the conversion table will be modified as shown in FIG. 14.

Cue Table

Figure 5:
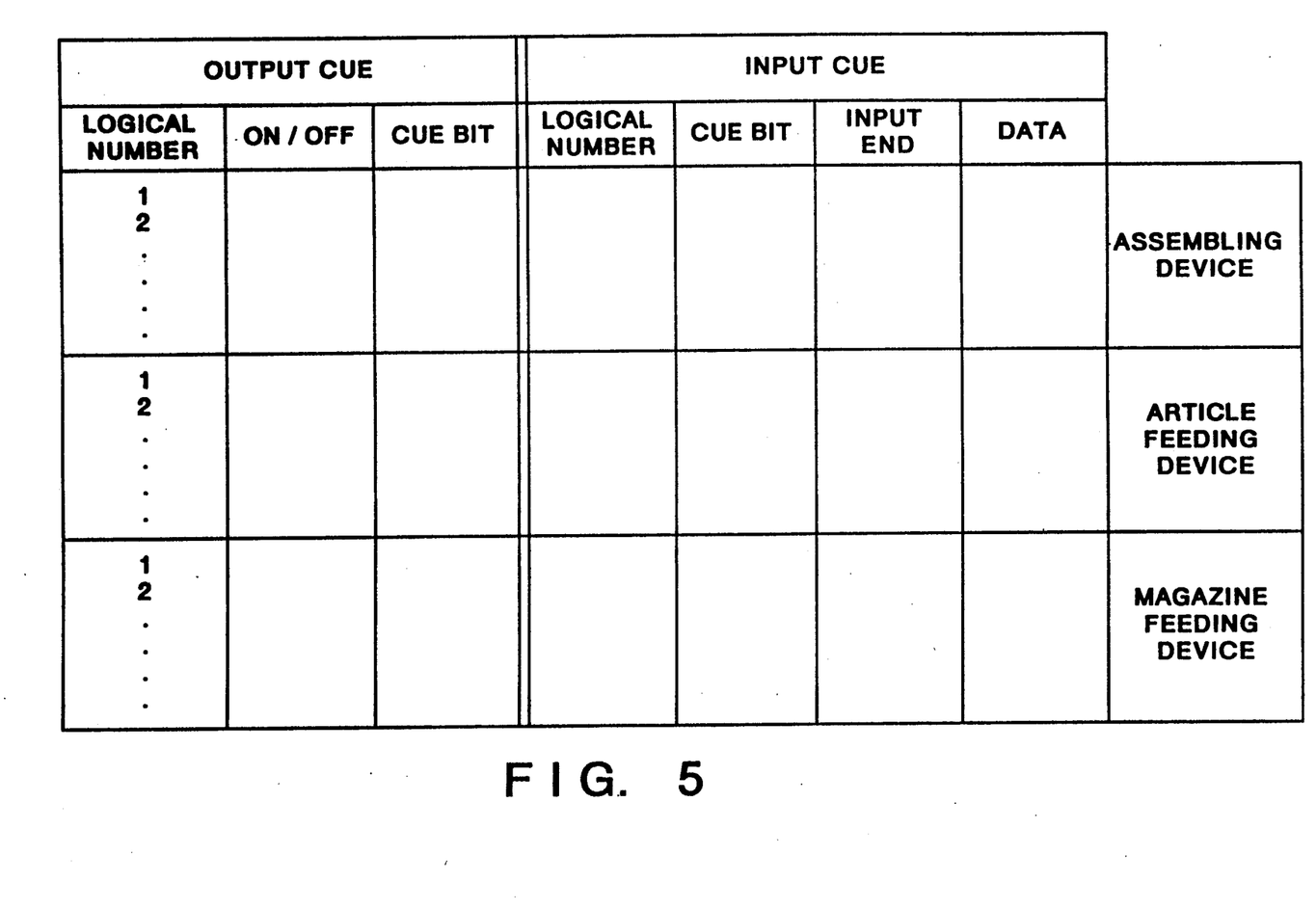
FIG. 5 is a diagram showing the constitution of a cue table.

FIG. 5 is a diagram illustrating the composition of data of the cue table 12a. The cue table is for cueing each of the input/output commands of each operating unit and is administered with logical numbers separately of the operating units. Cueing of commands to the cue table is performed by the master module 10e. Whether or not cueing has been performed is judged by the I/O module 11 based on the cue bit field shown in FIG. 5. In the output cue table, when an ON/OFF field is ON, this means that an output command which turns on a solenoid has been cued. An OFF field means that an output command which turns off a solenoid has been cued.

In FIG. 1, the transmission of commands between the terminal 13 and the master module 10e and between the latter and the cue table 12a is administered by the aforementioned "logical numbers". The I/O module 11 searches for and fetches a cue marked by an ON cue bit within the cue table and converts the "logical number" of this cue into a "physical number" in accordance the conversion table of FIG. 4.

As shown in FIGS. 4 and 5, the cue table and conversion table are partitioned according to operating unit, and therefore one terminal is capable of being shared by a plurality of operating units.

Mode Setting Control Procedure

Figure 6:
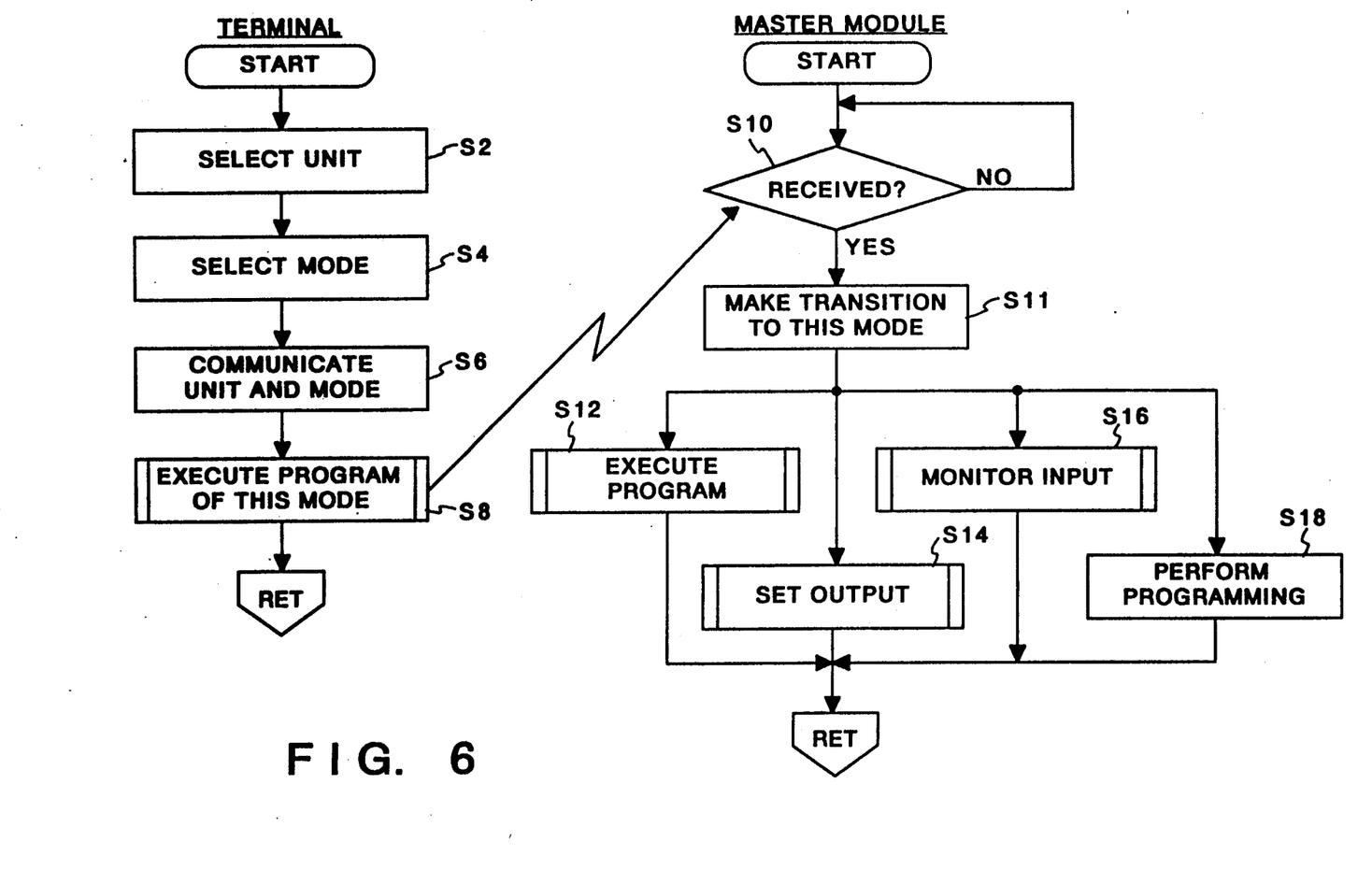
FIGS. 6 and 7 are flowcharts illustrating a control procedure of the embodiment.
Figure 7:
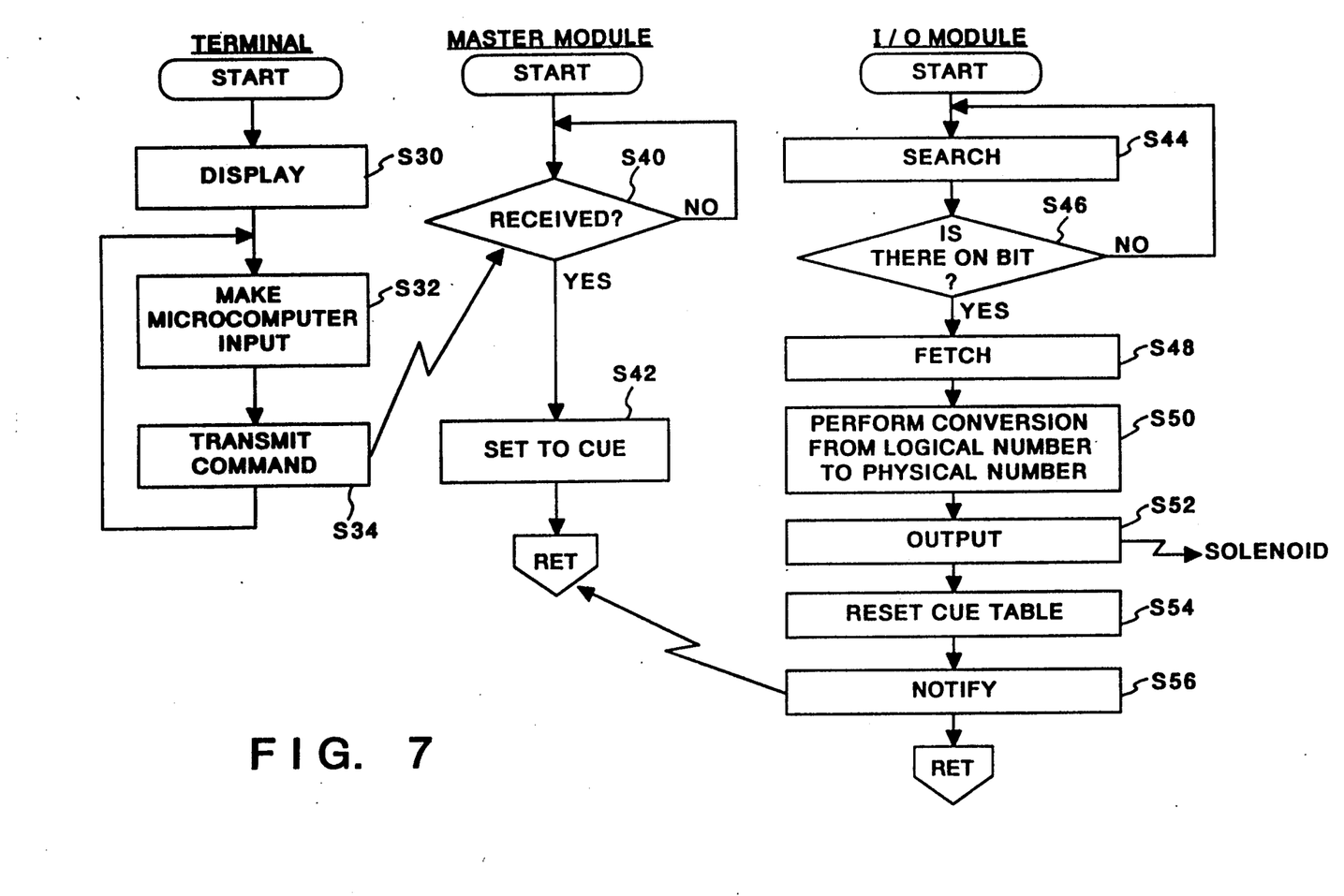

FIGS. 6 and 7 are flowcharts illustrating the control procedure of this embodiment. As described earlier, four mode programs for an operation execution mode, programming mode, output setting mode and input monitoring mode activated in response to an operation performed by the operator using the terminal 13 are set in the automatic assembling system of the embodiment shown in FIG. 2. The three modes of programming, output setting and input monitoring are directly related to man-machine interface control between the "physical numbers" handled by the system and the "logical numbers" handled by the programmer. As for the operation execution mode, if an assembly program contains a diagnostic routine, then, when the system shuts down during execution of the assembly program, as mentioned earlier, the "logical number" of the input/output element which triggered the shut-down is displayed on the terminal 13. This is the point at which man-machine interface control intervenes.

FIG. 6 is a flowchart of a control procedure for placing the system in any one of the above-mentioned four modes using the terminal 13. Step S2 is a step for selecting which operating unit is to have its mode set, and step S4 is for selecting which mode is to be set for this operating unit. Next, at step S6, the master module 10e is informed, via the RS232 bus, of which unit and mode have been selected. The program for the selected mode is executed at step S8 in order for the terminal itself to make a transition to the selected mode.

Figure 8:
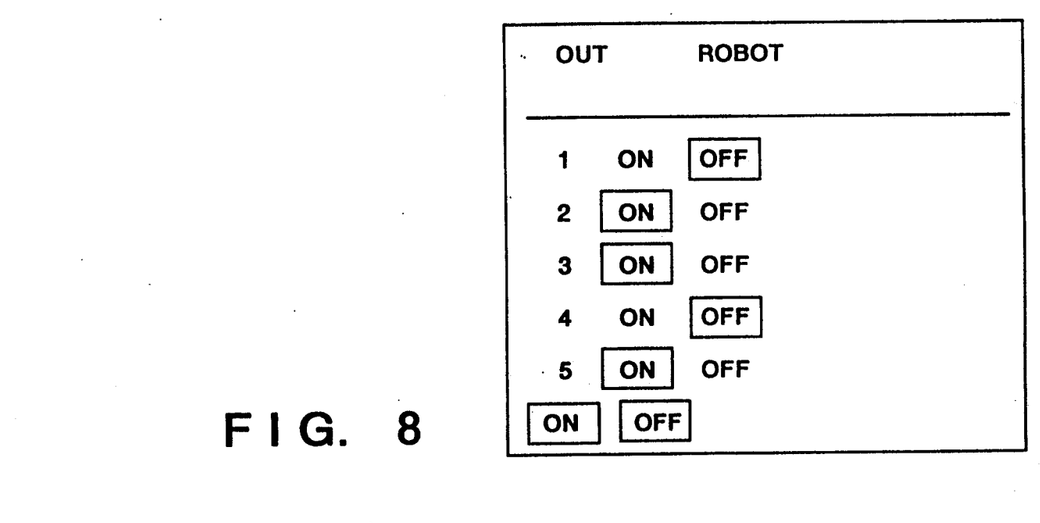
FIG. 8 is a diagram of a screen displayed on a terminal when the system of the embodiment is in an output setting mode.

FIG. 8 illustrates the image which the terminal 13 displays on its own monitor when the output setting mode is selected.

At step S10, the master module 10e receives the notification from terminal 13 regarding which unit and mode have been selected. This is followed by step S11, at which processing for the transition to the selected mode is performed. Thereafter, the program of the mode of any of steps S12 through S18 is executed.

Input/output Processing Control Procedure

Output Setting Mode

FIG. 7 is a flowchart illustrating the control relation among the terminal 13, master module 10e and I/O module 11 when the output setting mode has been set.

Steps S30 through S34 on the terminal side are the details of step S8 in FIG. 6. First, at step S30, the display of FIG. 8 is presented. FIG. 8 illustrates a menu screen for a case where the robot (the assembling device) 1 is selected and placed in the output setting mode. Numerals "1" through "5" in FIG. 8 are "logical numbers" set for the solenoids of the robot 1. If the operator performs an output operation, a cursor on this display screen is moved to the position of the "logical number" of the input/output element that is the object of the operation, and whether or not this element is to be actuated is designated by an ON switch or OFF switch set by function keys. This designation is made at step S32. Next, at step S34, the terminal 13 manipulated for the output operation sends the "logical number", provided with an ON or OFF identification code, to the master module 10e via the RS232C.

The master module 10e which has received the command attaches an ON or OFF command to this received output "logical number" and then sets the result in the cue table shown in FIG. 5.

The I/O module 11 periodically determines whether any cue bits in the cue table have been turned ON. This search operation is performed at steps S44 through S46. If there is a cue whose cue bit is ON, this cue is fetched at step S48. This is followed by step S50, at which the "logical number" of the output element of the fetched cue is converted into a physical number using the conversion table 11a within the I/O module. This output is sent to the corresponding output element at step S52. The bit of this cue is marked "OFF" at step S54. The master module is informed of the completion of operation at step S56.

Input Monitoring Mode

Though FIG. 7 has been described with regard to control of the output setting mode, operation is similar if the input monitoring mode is selected. After attaching an input request command code to the "logical number" of the input element designated from the display screen, the terminal 13 sends the result to the master module 10e via the RS232C.

The master module 10e which has received this command attaches a command signifying an input request to this received command and then sets the result in the cue table shown in FIG. 12a. The I/O module 11 converts the "logical number" of a cue, whose cue bit is ON, into a "physical number" from the conversion table 11a and informs of which sensor is to be inputted. After the output signal of this sensor is read, the I/O module 11 turns off the cue bit of the cue table. Further, the read signal value is written in the input data field of the cue table, the bit (FIG. 5) is marked at the end of input, and the master module 10e is informed of the completion of operation.

At the completion of operation, the master module 10e reads the input data out of the sensor of the cue table whose input-end flag is ON, attaches an input-information-command to the data and then returns display information to the terminal 13 via the RS232C.

Operation Execution Mode

Likewise, in the processing of an input/output instruction statement at the time of the operation execution mode, the input/output of the I/O module is activated or deactivated by the input/output "logical number" belonging to each operating unit.

Conversion Table Creation

A method of creating the conversion table of FIG. 4 will now be described with reference to FIGS. 9 and 10. As set forth above, the I/O module 11 receives the information necessary for creation of the conversion table from the master module when the system is initialized. This information is depicted in FIG. 9.

Figure 9:
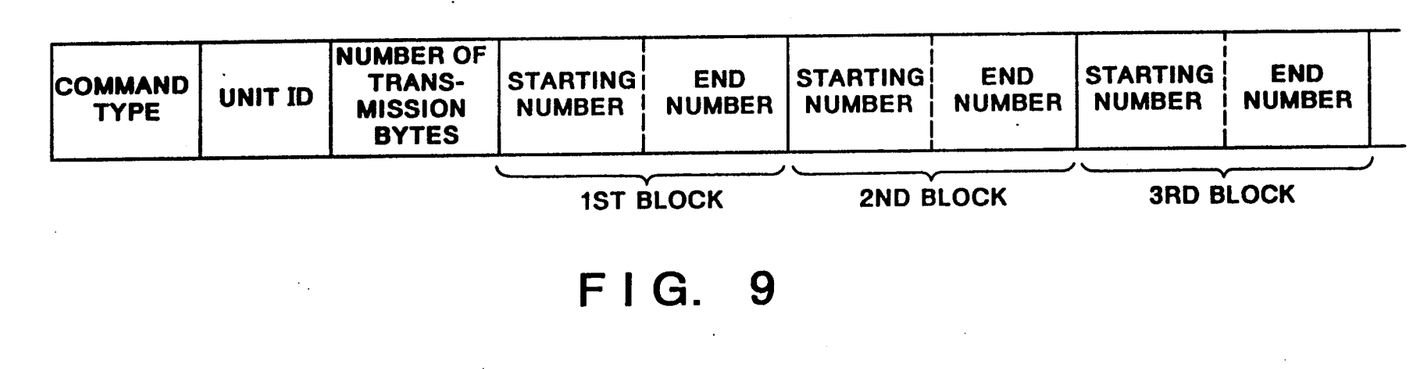
FIG. 9 is a format diagram showing the composition of information data sent from a master module to an I/O module when the conversion table of FIG. 4 is created in this embodiment.
Figure 10:
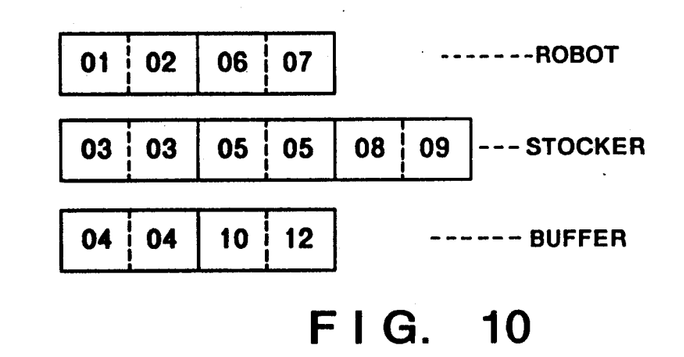
FIGS. 10 and 11 are diagrams showing an example of the composition of information data sent from a master module to an I/O module when the conversion table of FIG. 4 is created.

In FIG. 9, a command-type field stores an identification code which identifies this command as a table creation command. This table creation command has identification codes which differ depending upon whether the code is for input number conversion or output number conversion.

A unit classification field classifies the operating unit for which the table is created. A transmission byte-number field indicates the number of bytes in the overall command. The data from the first block to a k-th block is "physical number" data. A block stipulates consecutive "physical numbers". One block is divided into two fields, of which the initial field is a starting-number field and the latter field is an end-number field. For example, in a case where the output-number conversion table of FIG. 4 is created, the "physical numbers" "4", "10", "11" and "12" are set for the buffer 4. Therefore, the starting number of the first block is "04", the end number of this block is "04", the starting number of the second block is "10", and the end number of this block is "12". Thus, the plurality of consecutive "physical numbers" are stipulated by the "physical number" at the beginning and the "physical number" at the end of these numbers, thereby reducing the amount of amount of communication from the master module to the I/O module.

Figure 11:
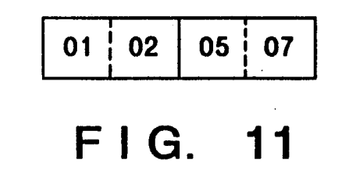

The input/output elements of the same "physical number" can readily be shared with different operating units. For example, in a case where the robot 1 would share the solenoid of "physical number" 5 with the stocker 2, the data for creating the conversion table for the robot would be as shown in FIG. 11. Specifically, the starting number of the first block is "01", the end number of this block is "02", the starting number of the second block is "05", and the end number of this block is "07".

Expansion and Modification of the Embodiment

The present invention can be expanded upon or modified without departing from the scope of the claims.

For example, in the input monitoring mode described above, the arrangement is such that an input monitoring command entered by the operator is delivered to the master module via the RS232 interface. However, since the operator cannot tell when a change in the state sensed by a sensor will occur, it is preferred for practical purposes that the terminal program per se be adapted to send the input monitoring command to the master module without requiring operator intervention.

Figure 12:
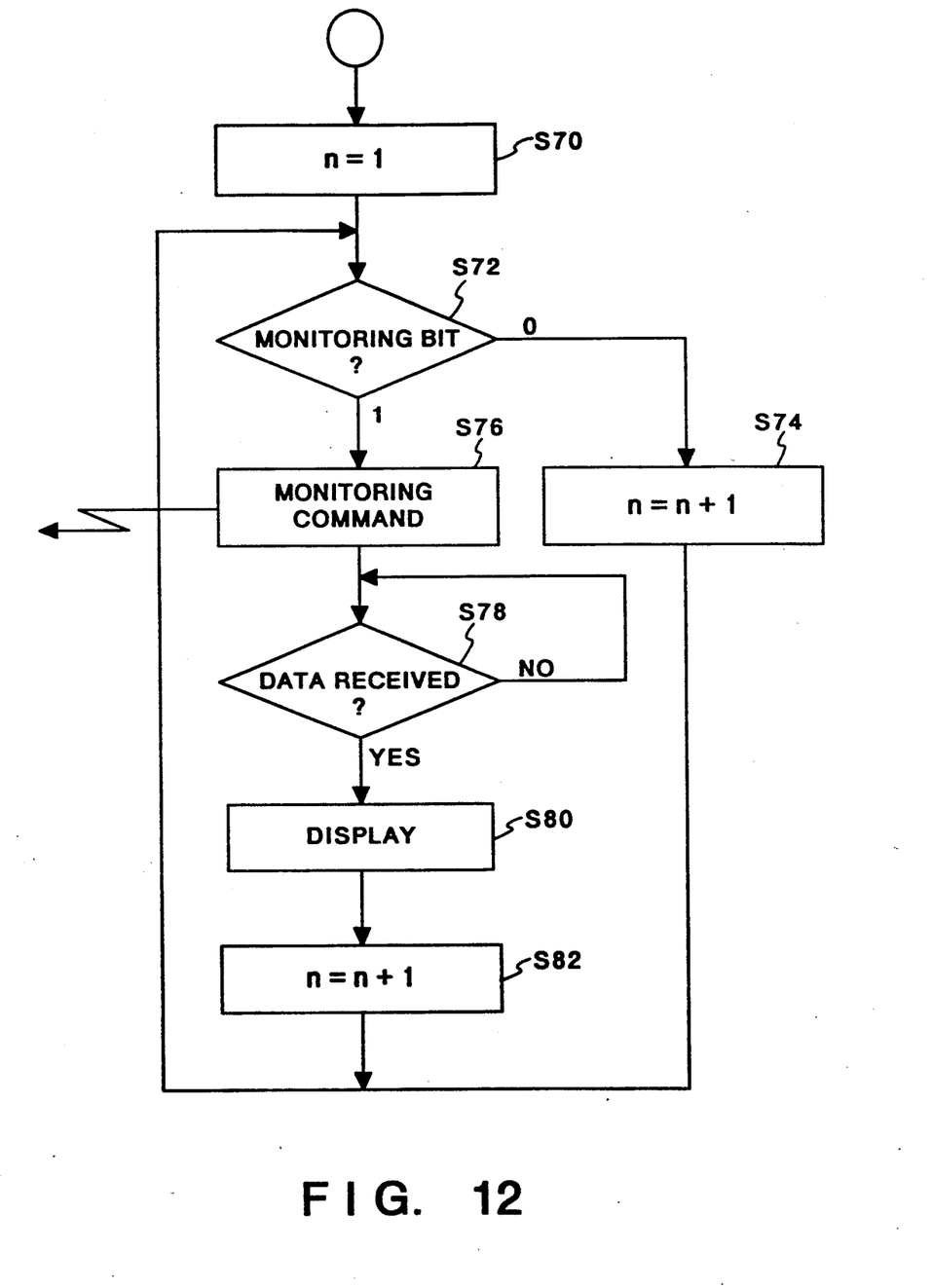
FIG. 12 is a flowchart showing a control procedure relating to a modification of an input monitoring mode.
Figure 13:
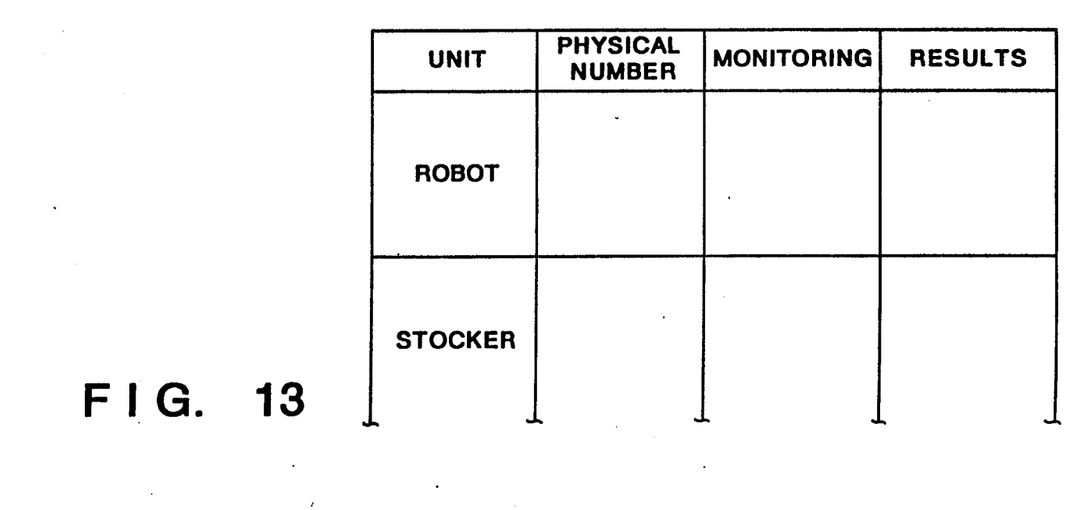
FIG. 13 is a diagram of a monitoring table used in the modification of the input monitoring mode.

To this end, an input monitoring mode terminal program of the kind shown in FIG. 12 is proposed. This monitoring program has a monitoring table of the kind illustrated in FIG. 13. This monitoring table is such that the input elements of every operating unit correspond to "physical numbers". The table possesses "monitoring bits" so that the operator can decide whether individual elements are the subject of monitoring.

In the flowchart of FIG. 12, "n" in step S70 is the name of "logical number" data apportioned to a selected unit. In step S70, n is initialized to "1". Whether the monitoring bit (FIG. 13) of the number corresponding to n is "1" is checked at step S72. The monitoring command is sent to the master module only for a monitoring bit which is "1". In other words, the identification code of this command and the pertinent "logical number" are sent at step S76. The master module that has received this command and the I/O module perform operations the same as those described in connection with FIG. 7, and the output signal of the input element is returned to the terminal. This is received at step S78, and at step S80 the received data is displayed on the monitor as the "RESULTS" of FIG. 13. Further, n is incremented at step S82. In a case where the terminal has sent a command, the terminal operates so as to receive a response (an acknowledgement or a resend request) to this transmission.

In accordance with this modification, the terminal side takes the initiative for collecting input signals. In general, a change in an input signal (sensor signal) occurs asynchronously. If, contrary to the foregoing modification, a request is sent to the terminal so as to collect data with the master module side taking the initiative when there is a change in an input signal, the communication protocol would be complicated and an enormous amount of software would be required.

The present invention is not limited to the above embodiments and various changes and modifications can be made within the spirit and scope of the present invention. Therefore, to apprise the public of the scope of the present invention, the following claims are made.

What is claimed is:

1. A controller for an automated apparatus comprising a plurality of independent operating units in cooperative relationship, each operating unit driving a plurality of input/output elements, said controller comprising:

first assigning means for assigning a physical number to each input/output element of said plurality of operating units so that every input/output element may be identified within said plurality of operating units;

second assigning means for assigning a logical number to each input/output element of each operating unit so that every input/output element may be identified within each operating unit;

input means for inputting a logical number with which one input/output element to be controlled can be specified;

conversion means for converting the input logical number into the corresponding physical number; and control means for controlling the specified element on the basis of the converted physical number.

2. The controller according to claim 1, wherein said input/output elements are sensor elements or solenoid elements, or servo-elements such as servomotors.

3. A controller for an automated apparatus comprising a plurality of independent operating units in cooperative relationship, each operating unit driving a plurality of input/output elements, said controller comprising:

program control means for controlling said plurality of operation units;

direct designating means which, when said program control means controls said plurality of operating units independently from an external unit, is for directly designating individual ones of said input/output elements within the automated apparatus by an exclusive first set of numbers;

external interface means for interfacing said external unit; and indirect designating means which, when said program control means communicates with the external unit via said interface means, is for indirectly designating individual ones of said input/output elements by a mutually exclusive second set of numbers within each of said operating units;

said indirect designating means having converting means for converting the second set of numbers into the first set of numbers;

wherein said controller comprises an externally provided terminal, which includes a display device and a keyboard, capable of being switchingly connected to each of said operating units via said interface means;

said program control means executes a program settable in an execution mode, a program forming mode, an output setting mode and an input monitoring mode; said terminal has a program for setting the controller to any of said modes; and said terminal is made capable of functioning as a man-machine interface with respect to any input/output element in each of said modes by one number of said second set which corresponds to this input/output element; and further comprises at least:

a master module for communicating with said terminal and controlling the overall controller;

one or a plurality of slave modules for controlling said input/output elements; and a memory coupled to said master module and slave modules by a bus and shared by these modules;

wherein a cueing table for cueing commands, which are for controlling said input/output elements and are managed by the second set of numbers of these input/output elements, is provided in said memory; and said slave module has an internal conversion table for converting said second set of numbers of the cued commands into said first set of numbers.

4. The controller according to claim 3, wherein said input/output elements are sensor elements or solenoid elements, or servo-elements such as servomotors.

5. The controller according to claim 3, wherein, in said input monitoring mode, the second set of numbers of input elements to be monitored as sent to the controller at a predetermined time interval along with a command to monitor the input elements.

6. The controller according to claim 5, wherein the slave modules comprise a plurality of servo modules for controlling the servo motors of said operating units and an I/O module for controlling all sensors and solenoids of all the operating units; and said conversion table is provided within said I/O module.

7. A method of designating input/output elements of an automated apparatus comprising a plurality of independent operating units in cooperative relationship, each operating unit driving a plurality of input/output elements, said method comprising the steps of:

assigning a physical number to each input/output element of said plurality of operating units so that every input/output element may be identified within said plurality of operating units;

assigning a logical number to each input/output element of each operating unit so that every input/output element may be identified within each operating unit;

inputting a logical number with which one input/output element to be controlled can be specified;

converting the input logical number into the corresponding physical number; and controlling the specified element on the basis of the converted physical number.

* * * * *

UNITED STATES PATENT AND TRADEMARK OFFICE
CERTIFICATE OF CORRECTION

PATENT NO. : 5,136,222
DATED : August 4, 1992
INVENTOR(S) : Toshihiro Yamamoto, et al Page 1 of 2

It is certified that error appears in the above-indentified patent and that said Letters Patent is hereby corrected as shown below:

On the title page, Item [56] References Cited:

"Kronier" should read --Kronies--.

COLUMN 11

Line 53, "operation" should read --operating--.

COLUMN 12

Line 12, "mode; said" should read --mode; (¶) said--.
Line 42 "claim 5," should read --claim 3,--.

COLUMN 2

Line 16, "through" should read --though--.

COLUMN 7

Line 46, "the" should read --these--.

COLUMN 8

Line 3, "accordance the" should read --accordance with the--.

UNITED STATES PATENT AND TRADEMARK OFFICE
CERTIFICATE OF CORRECTION

PATENT NO. : 5,136,222

DATED : August 4, 1992

INVENTOR(S) : toshihiro Yamamoto, et al

It is certified that error appears in the above-indentified patent and that said Letters Patent is hereby corrected as shown below:

COLUMN 10

```
Line 18, "amount" (second occurrence) should be deleted.
Line 10, "FIG. 4." should read --FIG. 10.--.
LlNE 19, "of" should be deleted.
```

Signed and Sealed this

Twelfth Day of October, 1993

Attest:

BRUCE LEHMAN

Attesting Officer

Commissioner of Patents and Trademarks